United States Patent [19]

Hishinuma et al.

[11] 4,003,711
[45] Jan. 18, 1977

[54] APPARATUS FOR ELIMINATION OF NITROGEN OXIDES FROM COMBUSTION WASTE GASES

[75] Inventors: Yukio Hishinuma; Hidetoshi Akimoto, both of Hitachi; Zensuke Tamura, Kudamatsu; Fumito Nakajima, Hitachi, all of Japan

[73] Assignee: Hitachi, Ltd., Tokyo, Japan

[22] Filed: Oct. 11, 1974

[21] Appl. No.: 514,130

[30] Foreign Application Priority Data

Oct. 12, 1973   Japan ............................ 48-113941

[52] U.S. Cl. .......................... 23/288 F; 23/288 B; 23/288 C; 23/288 G; 423/239
[51] Int. Cl.² ...................... B01J 8/12; B01J 23/94; F01N 3/15
[58] Field of Search ......... 23/288 B, 288 C, 288 E, 23/288 G, 288 F; 252/412, 420; 423/235, 239

[56] References Cited

UNITED STATES PATENTS

| | | | |
|---|---|---|---|
| 2,330,174 | 9/1943 | Hachmuth | 252/412 |
| 2,493,218 | 1/1950 | Bergstrom | 23/288 G X |
| 2,913,404 | 11/1959 | Lieffers et al. | 23/288 G X |
| 2,924,504 | 2/1960 | Reitmeier | 423/235 |
| 2,973,326 | 2/1961 | Hodgins et al. | 252/412 |
| 3,032,387 | 5/1962 | Anderson et al. | 423/235 |
| 3,497,328 | 2/1970 | Calvert | 23/288 B X |
| 3,512,925 | 5/1970 | Buechler et al. | 423/235 X |

FOREIGN PATENTS OR APPLICATIONS

301,736   4/1930   United Kingdom .............. 252/412

*Primary Examiner*—Joseph Scovronck
*Assistant Examiner*—Arnold Turk
*Attorney, Agent, or Firm*—Beall & Jeffery

[57] ABSTRACT

Nitrogen oxides (NOx) are removed from combustion waste gases by injecting gas (NH₃) into the combustion waste gases in the presence of a metallic catalyst to deoxidize the nitrogen oxides to nitrogen and water, within a reaction tower having the catalysts moving through the reaction tower, so that thereafter the dust may be separated from the catalysts and the catalysts may be regenerated continuously, so that the regenerated catalysts may be returned to the reaction tower. The catalyst moves in a substantially closed path, and preferable downwardly through the reaction tower, with the ammonia gas and combustion waste gases moving in cross current through the reaction tower, with mixing being enhanced by a plurality of angled baffle plates. Regeneration is accomplished by washing the catalysts, particularly ferrous catalysts with water to remove ferric sulfates, thereafter providing ferrous sulfates on the surface of the ferrous catalysts, and thereafter heating the catalysts with combustion gases separate from the ammonia gases, to dry the catalysts prior to their moving into the portion of the reaction tower having therein the mixed ammonia gas and combustion waste gases.

10 Claims, 1 Drawing Figure

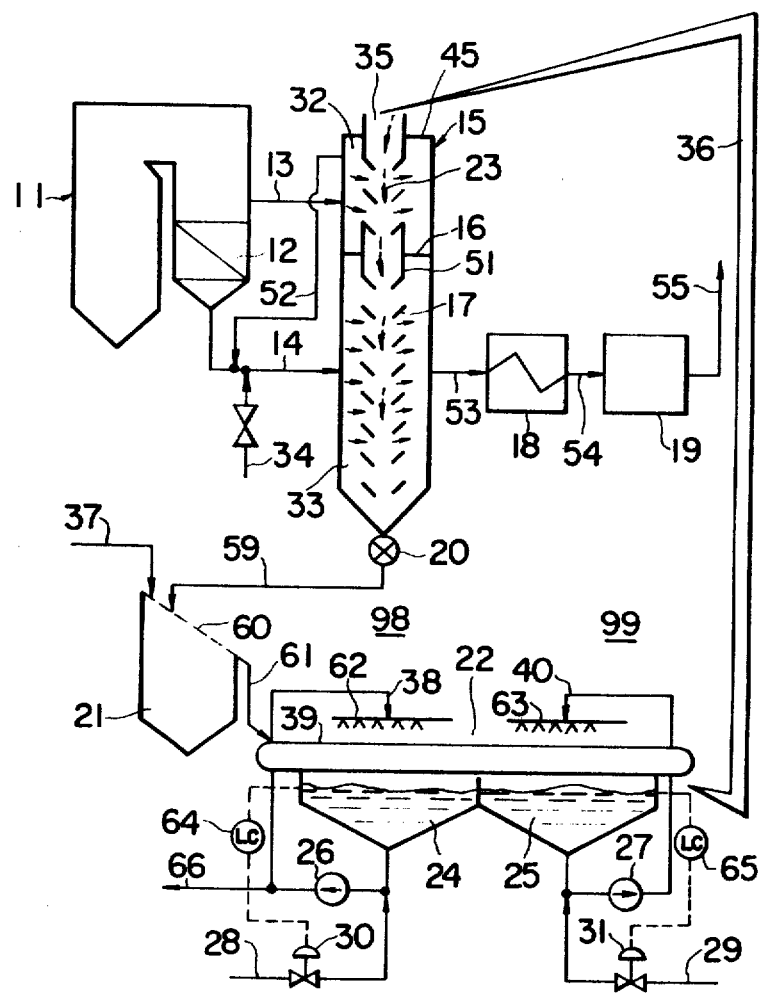

APPARATUS FOR ELIMINATION OF NITROGEN OXIDES FROM COMBUSTION WASTE GASES

BACKGROUND OF THE INVENTION

The present invention relates to apparatus and method for the elimination of nitrogen oxides (NOx) from combustion waste gases, particularly for deoxidizing the nitrogen oxides by injecting ammonia gas ($NH_3$) therein, in the presence of a metallic catalyst.

Discharge of the combustion waste gases into the atmosphere without treatment is highly objectionable, because the nitrogen oxides are corrosive and act as atmospheric pollutants. Thus, it is desirable to treat such combustion waste gases in order to eliminate the nitrogen oxides prior to their being discharged into the atmosphere. The usual approach to such treatment is to catalytically react the combustion waste gases containing nitrogen oxides with a reducing gas, such as methane, hydrogen or ammonia.

It is well known to conduct the combustion waste gases and ammonia gas for deoxidizing the nitrogen oxides into a reaction tower containing catalysts to promote the deoxidation. Heretofore, a layer of catalysts has been fixedly disposed in the reaction tower and various metallic sulfides, metallic oxides and metallic alloys have been employed as the catalysts. Generally, however, the combustion waste gases contain a large quantity of dust and uncombustible materials, so that the dust and uncombustible materials attach themselves to the catalysts to worsen the catalytic properties of the catalysts.

SUMMARY OF THE INVENTION

It is an object of the present invention to provide an apparatus and method for the elimination of nitrogen oxide from combustion waste gases, which can operate continuously while at the same time maintaining the catalytic properties of the catalysts for deoxidizing the nitrogen oxides, particularly by regenerating the catalysts on a continuous basis. Further, the normal deterioration of the catalysts is lessened, so that the overall size of the reaction tower may be smaller as compared with comparable units according to the prior art. The catalysts are regenerated by being recirculated in a substantially closed loop through the reaction tower after regeneration.

The nitrogen oxides are removed from the combustion waste gases by injecting ammonia gas into the combustion waste gases to deoxidize the nitrogen oxides to nitrogen and water within a reaction tower having therein metallic catalysts moving in a closed loop including the reaction tower. Dust is removed from the metallic catalyst after reaction, and thereafter the catalysts are regenerated and returned to the reaction tower for further contact with the combustion waste gases and ammonia. The metallic catalysts may be of any different known types, for example titanium catalysts or ferrous catalysts, and when the ferrous catalysts are used, the regeneration employs water washing of the ferrous catalysts to remove ferric sulfate, subsequent addition of ferrous sulfate, and finally heating of the ferrous catalyst to dry it with combustion gases out of contact with the ammonia, prior to contacting the catalyst with the ammonia gas and combustion waste gases for reaction which heating also changes the chemical composition of some of the ferrous catalysts.

BRIEF DESCRIPTION OF THE DRAWING

Further objects, features and advantages of the present invention will become more clear from the following detailed description of the drawing, wherein:

The single FIGURE of the drawing is a schematic diagram of a preferred embodiment of the present invention.

DESCRIPTION OF THE PREFERRED EMBODIMENT

The catalyst employed in the preferred embodiment is a ferrous catalyst, particularly an iron oxide catalyst, which is employed to deoxidize the nitrogen oxides (NOx). If the catalyst remained stationary with respect to the reacting ammonia gas and combustion waste gases, over a long continuous run of deoxidizing the nitrogen oxides in the combustion waste gas, for example obtained from the thermal power generation plant, the catalyst $Fe_2O_3$ and $FeSO_4$ would react with the sulfuric oxides $SO_3$ contained in the combustion waste gases at high temperatures, to produce ferric sulfate $Fe_2(SO_4)_3$ which production of ferric sulfate would correspondingly decrease the catalytic action of the catalysts. Thus the reaction would become more inefficient or slower, so that finally the catalyst would have to be removed and replaced, and to lengthen the time between such removal, it would be necessary to greatly enlarge the reaction tower. These results are considerable disadvantages of such a process and apparatus.

Such a deterioration of the catalytic action of the catalysts as caused by $SO_3$ contained in the combustion waste gases similarly occurs in the case of other catalysts, for example titanous catalysts.

The present invention continuously moves the catalysts, particularly metallic catalysts through the reaction tower and in a substantially closed loop so that they may be regenerated primarily outside of the reaction tower and so that the reacting of ammonia gas with the nitrogen oxides from the combustion waste gases may be continuous with the continuous removal of catalysts and the continuous addition of regenerated catalysts.

The removal of nitrogen oxides from combustion waste gases is accomplished by injecting ammonia gas into the combustion waste gases to deoxidize the nitrogen oxide to nitrogen and water within a reaction tower containing ferrous catalysts moving therein, with the catalysts moving out of the reaction to a device for separating dust from the catalyst, which dust was picked up by the catalyst from the combustion waste gases, and further to a regenerating apparatus for regenerating the catalyst prior to the return of the catalyst for further reaction. With the usage of a ferrous catalyst, which is the preferred embodiment, ferric sulfate is formed on the surface of the catalyst during the reaction, and the regeneration removes the ferric sulfate from the surface of the catalysts, by washing after the separation of the dust. Thereafter, the regeneration further provides ferrous sulfate $FeSO_4$ on the surface of the catalysts after the elimination of the ferric sulfate. The thus treated catalyst with the ferrous sulfate is then returned to the reaction tower where it can be heated to temperatures of 400° to 600° C to complete the regeneration of the catalyst. The apparatus and method of the present invention may be used with a thermal power generation plant provided with an economizer. With such a thermal power generation plant, a conduit may be connected to an inlet of the economizer and to the upper portion of the reaction tower to directly conduct a part of the combustion gases at a high temperature from a boiler to the reaction tower, whereby the wetted catalysts are economically heated in the reaction tower for completing the regeneration.

Specific apparatus used in the preferred embodiment is shown in the drawing in detail, wherein a boiler 11 is provided with an economizer 12, which may be a part of a conventional thermal power generation plant. A reaction tower 15 is divided into an upper stage, inlet portion 32 and a lower stage, downstream portion 33 by a partition 16, which partition 16 has a hopper 51 in its center. The upper end plate 45 of the upper stage 32 further has a hopper 35. The reaction tower is provided with a large number of baffle plates 17 spaced from each other along the central portion of the reaction tower for substantially its entire length. Each of the baffle plates 17 is inclined from the outside to the inside and further downwardly, and opposite baffle plates are symmetrical with respect to each other about the center line of the reaction tower. The reaction tower contains catalysts 23 which can move in the reaction tower from the upper portion to the lower portion in a continuous manner. The preferred ferrous catalysts consist of a carrier such as an alumina carrier or a silica gel carrier and a layer of ferrous sulfate ($FeSO_4$) and ferric oxide $Fe_2O_3$ on the surface of the carrier. That is, the catalyst preferably includes a suitable carrier such as alumina pellets or silica gel. While a ferrous catalyst is preferred, other metallic catalysts, which are known in the prior art, such as titanous catalysts, may be used. The catalytic reaction of the nitrogen oxides with the reducing gas, particularly, ammonia gas, results in the elimination of the nitrogen oxides, with the formation of free nitrogen and water vapor.

The upper stage 32 is connected to an inlet portion of the economizer 12 through a conduit 13, and a part of the combustion gases at high temperatures is conducted to the upper stage 32 through the conduit 13. The lower stage 33 of the reaction tower is connected to an outlet portion of the economizer 12 through a conduit 14, and the combustion waste gases are conducted to the lower stage 33 through the conduit 14 simultaneously with the introduction of ammonia gas through the conduit 34 into the combustion waste gases within the conduit 14, so that mixed ammonia gas and combustion waste gases are injected into the reaction tower through the conduit 14. A rotary valve 20 is provided in the lower end of the reaction tower 15, so that it will control the rate of discharging the catalysts in correspondence with the rotation speed of the rotary valve 20.

The lower stage of the reaction tower is connected to a heat exchanger 18 for cooling the combustion waste gases that are removed from the reaction tower through conduit 53; thereafter the cooled combustion waste gases are desulfurized in a conventional device 19, which is connected with the heat exchanger 18 through conduit 54. The thus desulfurized gases are exhausted to a chimney (not shown) through a conduit 55.

A dust separator 21 is provided with a vibrating sieve 60 on which the catalysts are discharged from the rotary valve 20 through the conduit 59. The dust, which was picked up by the catalysts from the combustion waste gases within the reaction tower, is removed or separated from the catalysts by the sieve 60, and the thus separated dust falls into the separator chamber 21. The catalysts are then shifted to a conveyor 39 along flow path 61. Supplementary or makeup alumina carrier or other carriers are supplied to the sieve 60 through the conduit 37. Accordingly, the alumina carrier is shifted to the conveyor 39 together with the catalysts. A regenerating device 22 is provided with the conveyor 39, and comprises a washer 98 including a water sprayer 62 and a water receiver 24, and an impregnating device 99 including a sprayer 63 and an impregnating agent receiver 25. The catalysts are washed by the water sprayed by the sprayer 62 for the removal of the ferric sulfate $Fe_2(SO_4)_3$, which is then collected with the water in the water receiver 24. Thereafter, the thus washed catalyst is transferred by the conveyor 39 to the impregnating device 99 where ferrous sulfate is added to the catalyst.

The water with ferric sulfate is discharged from the bottom of the water receiver 24 through a conduit 66 by means of a pump 26. Fresh water is supplied in the conduit 28 under the control of the valve 30, so that recirculating water is conducted to the sprayer 62 through a conduit 38. The level of the water within the water receiver 24 is detected and maintained by a level detector (not shown), which level detector controls the opening and closing of the valve 30 disposed within the conduit 28 for controlling the quantity of water added to the system; the controller 64 opens the valve when the water level is lower than a predetermined level and closes the valve 30 when the water level within receiver 24 is higher than a predetermined level.

The impregnating liquid that is sprayed on the washed catalyst through the sprayers 63 is preferably a solution of desolved ferrous sulfate ($FeSO_4$). The ferrous sulfate is annexed on the surface of the catalyst to impregnate gradually. The remains of the impregnating solution is collected in the impregnating agent receiver 25. The solution is discharged from the bottom of the impregnating agent receiver 25 through a conduit and returned through conduit 40 by the pump 27 to the sprayer 63. Fresh solution is supplied through a conduit 29 under the control of valve 31 to maintain the level of solution within the receiver 25. The level of solution within the receiver 25 is determined by a detector (not shown), which operates a level controller 64 for opening the valve 31 within the conduit 29 when the level within the receiver 25 is lower than a predetermined level and to close the valve 31 when the level within the receiver 25 is higher than a predetermined level.

The regenerated catalysts that were washed and provided with ferrous sulfate are then moved from the conveyor 39 to a lift conveyor 36, which is provided with a plurality of vertically moving buckets (not shown) and transferred upwardly to the top of the reaction tower. At the top of the vertical bucket conveyor, the catalysts are returned to the hopper 35. The catalysts are heated in the upper stage 32 of the reaction tower at a temperature about 400° to 600° C by the combustion gases conducted to the upper stage 32 of the reaction tower from the conduit 13, so that regeneration of the catalysts is completed by drying the catalysts. The catalysts provided with the ferrous sulfate are oxidized by heating at the temperature of 400° to 600° C and changed in chemical formula to ($Fe_2O_3$)X or ($FeSO_4$)Y so that the deoxidizing property of the catalysts are recovered. At that time an amount of $FeSO_4$ carried is about 5 to 15% by weight ratio with respect to the carrier and Y/X is in the range of 5 to 20%. The combustion gases cooled by the heat exchange with the catalysts are discharged through a conduit 52 for mixing with the combustion waste gases in the conduit 14 and together they are supplied to the lower stage 33 of the reaction tower.

Suitable temperatures for deoxidizing the nitrogen oxides NOx are in the range of 250° to 400° C and generally the temperatures of the combustion waste gases from the outlet of the economizer 12 are in this range. Therefore, it is desirable to add the ammonia gas to the combustion waste gases for mixing therewith, and thereafter to supply the mixture to the lower stage of the reaction tower for contact with the catalysts. The mixture passes through a layer of the catalysts in the direction of the arrows, in cross current with the moving catalysts, as shown in the drawing and during this passing, the nitrogen oxides NOx contained in the mixture are deoxidized in the presence of the catalysts by the reducing agent, particularly the ammonia gas.

A specific operational example of the apparatus and method embodying the present invention is as follows.

The amount of the combustion gases discharged from a boiler was 100,000Nm$^3$/h and the gasous components of the waste gases consisted of 300 ppm NOx, 1000 ppm $SO_2$, 50 ppm $SO_3$, 10% $H_2O$, 1.5% $O_2$ and 11% $CO_2$ by volume. The amount of the catalysts ferrous sulfate was 10 m$^3$. The ammonia gas injected into the combustion gases was in an amount of 240 ppm. As a result, the deoxidizing ratio of NOx was 90%. During the operation, the temperature in the lower stage was 350° C, the temperature in the upper stage was 550° C, the amount of the catalysts discharged from the lower stage was 90 kg/h, the supplementary or makeup amount of the carriers was 0.9 kg/h, and the amount of dust separated by the dust separator was 1.9 kg/h. The amount of recirculating water at the washer 98 was 100t/h, the supplementary amount or makeup amount of fresh water was 100 kg/h and the amount of the discharged water was 63 kg/h. The amount of the recirculating solution for the impregnating device was 100t/h, the supplementary or makeup amount of $FeSO_4$ was 9 kg/h and the carrying ratio of $FeSO_4$ carried in the catalysts was 10%. The catalysts contained 30% water by volume when returned to the hopper 35 by vertical conveyor 36 and the amount of the combustion gases used for heating the catalysts in the upper stage 32 was 325 Nm$^3$/h.

As mentioned above, the present invention can provide an apparatus and method for eliminating nitrogen oxides NOx from combustion waste gases on a continuous basis while maintaining the catalytic properties of the catalysts for deoxidizing the nitrogen oxides, and especially the invention can recover, regenerate and recirculate the catalysts as their catalytic properties are lessened due to the reaction.

While a single preferred embodiment has been described, with variations and a specific example, with such specifics being advantageous in their own right, further embodiments, modifications and variations are contemplated according to the broader aspects of the present invention all as determined by the spirit and scope of the following claims.

We claim:

1. An apparatus for the removal of nitrogen oxides (NOx) from combustion waste gases, comprising: a reaction tower having a combustion waste gas inlet and outlet; a fluent ferrous catalyst within said reaction tower; means for injecting a reducing gas into the combustion waste gases to deoxidize the nitrogen oxides in the presence of said ferrous catalyst within said reaction tower; means for moving said ferrous catalyst in a substantially closed path including entry into the top of said reaction tower, movement downwardly through said reaction tower in contact with the mixed combustion waste gases and the reducing gas, and exit from the lower portion of said reaction tower; means for separating dust from said ferrous catalyst after it has exited from the reaction tower where dust was picked-up from the combustion waste gases; means for regenerating the ferrous catalyst of the reaction tower; said means for regenerating including means for washing the ferrous catalyst for removing ferric sulfate, which was produced by reaction of the sulfur oxides in the waste combustion gases with the ferrous catalyst, from the surface of the ferrous catalyst after the means for separating dust has separated dust from the ferrous catalyst exiting from the reaction tower; said means for regenerating including means for providing ferrous sulfate on the surface of the ferrous catalyst after it has passed through said means for washing; and said regenerating means including means for heating the ferrous catalyst after washing by a part of the combustion waste gases prior to their movement in contact with the mixed combustion waste gases and the reducing gas in the reaction tower.

2. The apparatus of claim 1, including means for mixing the reducing gas with the combustion waste gas in a conduit prior to their entry into said reaction tower.

3. The apparatus of claim 1, wherein said washing means includes conveyor means for moving the ferrous catalyst along said substantially closed path and includes means for spraying water on said catalyst being carried by said conveyor means.

4. The apparatus of claim 1, including means for separating said reaction tower into an inlet heating portion containing said heating means and a downstream portion, with respect to the movement of said ferrous catalyst, in fluid communication with said inlet heating portion, wherein said ferrous catalyst contacts with the reducing gas and combustion gases.

5. The apparatus of claim 4, including means for desulfurizing the combustion gases after they have reacted with the reducing gas and passed through said ferrous catalyst.

6. The apparatus of claim 4, wherein said moving means moves said ferrous catalyst in cross current with said combustion waste gases and said reducing gas through said downstream portion of said reaction tower.

7. The apparatus of claim 4, wherein said reaction tower includes a plurality of baffle plate means inclined inwardly and downwardly toward the geometric center of the path of movement of said ferrous catalyst through said reaction tower in fluid communication with and between the combustion waste gas inlet and outlet for improving the contact between the ferrous catalyst and combustion waste gas.

8. The apparatus of claim 7, wherein said moving means moves said ferrous catalyst in cross current with said combustion waste gases and said reducing gas through said reaction tower and said baffle plates.

9. The apparatus of claim 4, including means for mixing the reducing gas with the combustion waste gases in a conduit prior to their entry into said downstream portion of said reaction tower.

10. The apparatus of claim 9, wherein said moving means moves said ferrous catalyst in cross current with said combustion waste gases and said reducing gas through said downstream portion of said reaction tower.

* * * * *